Patented Sept. 28, 1954

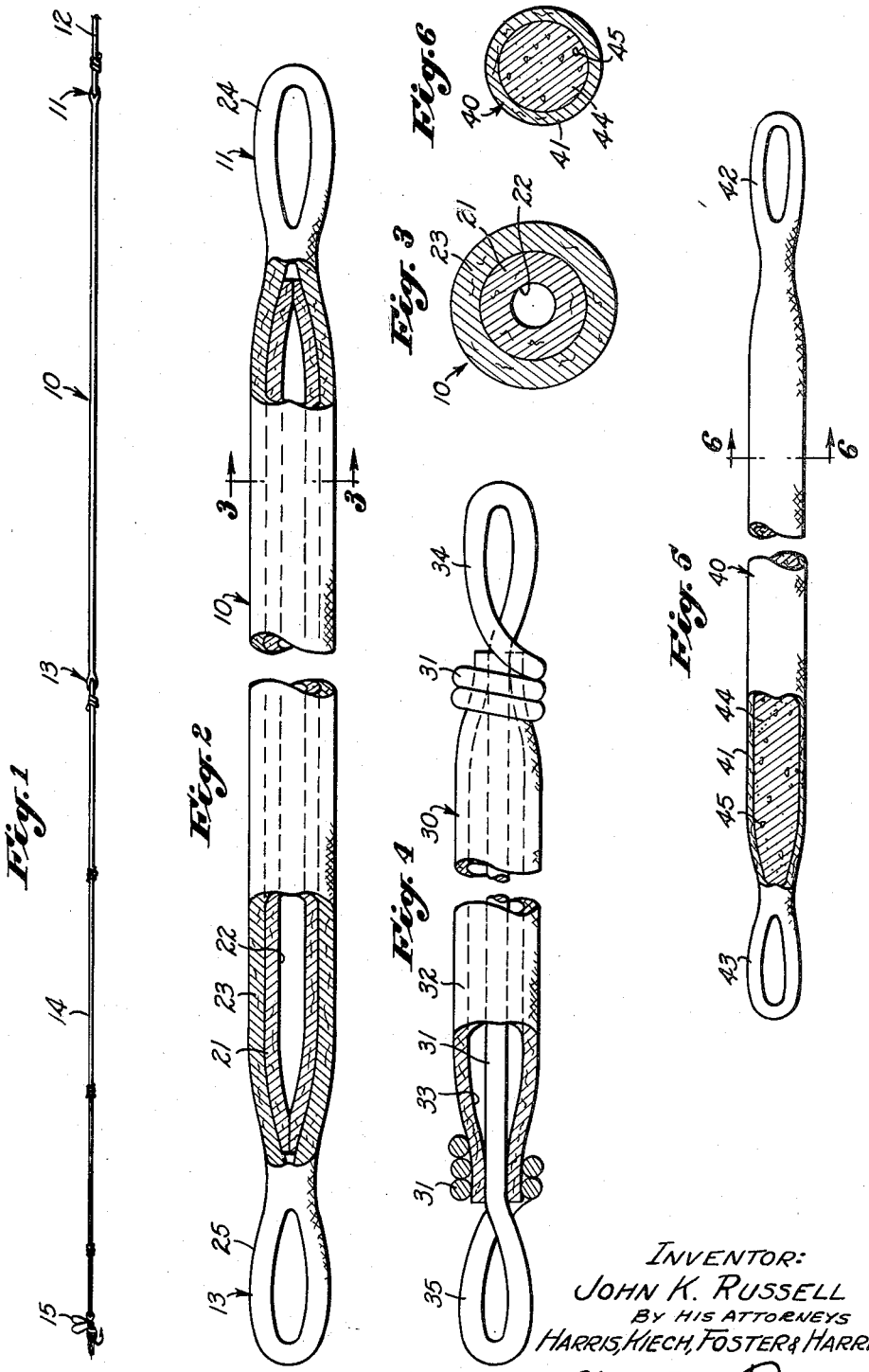

2,690,027

UNITED STATES PATENT OFFICE 2,690,027

FLOATING TIP FOR FISHLINES

John K. Russell, North Hollywood, Calif.

Application March 9, 1950, Serial No. 148,554

2 Claims. (Cl. 43—44.98)

My invention relates in general to fly casting and, more particularly, to a floating tip for a fly line which provides sufficient weight at the end of the fly line to enable the angler to cast greater distances without splashing, the provision of such a device being a primary object of the invention.

Fly casting without a weighted line is extremely difficult since the weight of the fly, leader and line alone is insufficient to carry the fly out to any effective distance from the tip of the rod. Various expedients have been employed to overcome this difficulty, one being to provide the necessary weight by using a tapered line. Such a tapered line has the disadvantage of occupying too much space on the reel so that a length of tapered line equal only to a small fraction of the capacity of the reel for ordinary uniform-diameter fly line can be wound upon the reel. Other expedients which have been employed heretofore have this and/or other disadvantages, such as producing excessive splashing, thereby frightening the fish.

The present invention overcomes such disadvantages of previously employed expedients by providing a floating tip for the fly line which is of substantial length, e. g., of the order of magnitude of five feet, and which may be attached at one end to the end of the fly line and at its other end to any desired leader which carries the fly, the provision of such a floating tip being an object of the invention.

Another object of the invention is to provide such a floating tip having a specific gravity of less than unity so that it will float on the surface of the water upon completion of the cast. Preferably, the specific gravity of the floating tip is materially less than one to substantially eliminate, or at least minimize, any splashing upon contact of the floating tip with the surface of the water.

Another object of the invention is to provide a floating tip of this character which is provided with a specific gravity of less than unity by making the floating tip hollow over a substantial portion of its length so that its displacement is materially greater than its weight.

An object in connection with another embodiment of the invention is to provide such a floating tip with a specific gravity less than unity by employing a core of powdered cork, or other similar material having a very low specific gravity, and by mixing with the powdered cork a material such as lead to provide the desired weight, the core being enclosed in an envelope carrying means for attachment of the floating tip to the fly line and leader.

Another object of the invention is to provide floating tips of the foregoing character which are quite flexible and which are not of materially greater diameter than the fly line and leader.

The foregoing objects and advantages may be attained with the exemplary embodiments of the invention which are illustrated in the accompanying drawing and which are described in detail hereinafter. Various other objects and advantages of the invention will also be discussed hereinafter. Referring to the drawing:

Fig. 1 is a utility view illustrating the invention interposed between the end of a fly line and a leader carrying a fly;

Fig. 2 is a view, partially in longitudinal section and partially in elevation, illustrating one embodiment of the invention;

Fig. 3 is an enlarged, transverse sectional view taken along the broken line 3—3 of Fig. 2;

Fig. 4 is a view, partially in longitudinal section and partially in elevation, illustrating another embodiment of the invention;

Fig. 5 is a view, partially in longitudinal section and partially in elevation, illustrating still another embodiment of the invention; and, Fig. 6 is an enlarged, transverse sectional view taken along the broken line 6—6 of Fig. 5.

Referring particularly to Fig. 1 of the drawing, the numeral 10 designates a floating tip of the invention having means 11 at one end for attachment to a fly line 12 and having means 13 at its other end for attachment to a leader 14 which carries a fly 15 at its outer end, the leader 14 illustrated being of the tapered variety. Because of the fact that, as will be discussed in more detail hereinafter, the floating tip 10 of the invention provides the weight necessary to permit casting the fly 15 substantial distances, the fly line 12 may be, and preferably is, a very fine monofilament line of plastic, or other suitable material, to permit a reel, not shown, for the fly line to accommodate a substantial length of line.

As hereinbefore indicated, the floating tip 10 may be several feet in length, e. g., of the order of magnitude of five feet, and is preferably of a diameter not materially greater than the diameter of the fly line 12. With this construction, sufficient weight is provided to enable the angler to cast substantial distances without adding materially to the bulk of the system. Also, as will be discussed in more detail hereinafter, the floating tip 10 is preferably made quite flexible to permit casting in the normal manner.

Referring particularly to Figs. 2 and 3, the floating tip 10 comprises a hollow core 21, which may, for example, consist of a length of plastic tubing closed at its ends to provide an air space 22. The core 21 is enclosed by an envelope or jacket 23 which converges toward its ends to close the ends of the core 21 in a water tight manner. Additionally, the ends of the core 21 may be sealed with a suitable cement or other sealing material to insure making the air space 22 water tight. The envelope 23 may be of woven construction, e. g., of fabric. However, other materials for the envelope 23 may also be employed. The envelope 23 is provided at its ends with loops 24 and 25, respectively, which serve as the aforementioned attachment means 11 and 13, respectively, for the fly line 12 and leader 14, respectively. As illustrated in Fig. 1, the fly line 12 and leader 14 may be inserted through the loops 24 and 25, respectively, and then tied in the usual manner. In the event that a woven envelope 23 is employed, the loops 24 and 25 may be formed by braiding the ends of the woven envelope, or otherwise.

The volume of the air space 22 is such as to make the displacement of the floating tip 10 greater than its weight so as to make the specific gravity of the floating tip less than one. Preferably, the volume of the air space is such as to provide the floating tip with a specific gravity of materially less than one to substantially eliminate splashing upon contact of the floating tip with the water as a cast is made.

The floating tip provides sufficient weight to permit casting substantial distances, because of the relatively substantial length of the floating tip, while still providing a specific gravity of less than one to minimize splashing, which is an important feature of the invention.

Referring to Fig. 4, the numeral 30 designates a floating tip of the invention which includes a length of monofilament line 31 which extends through an elongated envelope 32, a length of leader, for example, being suitable for the length of monofilament line 31. The internal diameter of the envelope 32, which may be of woven construction, or of any other suitable construction, is greater than the diameter of the monofilament line 31 to provide an annular air space 33, the purpose of such air space being to provide the floating tip 30 with a displacement greater than its weight, as in the case of the air space 22 of the floating tip 10, so as to provide the floating tip 30 with a specific gravity less than one. The ends of the envelope 32 converge into water tight contact with the line 31 and the ends of the line 31 are doubled back to form loops 34 and 35 corresponding to the loops 24 and 25, respectively, of the floating tip 10. The end portions of the line 31 are then wound around the end portions of the envelope 32 which are in contact with the line, and are then tied in any suitable manner, not shown, to retain the end portions of the envelope in water tight contact with the line to seal the air space 33. If desired, a suitable sealing material, such as cement, may be interposed between the end portions of the envelope 32 and the line 31 to insure a water tight seal for the air space 33.

Referring to Figs. 5 and 6, the numeral 40 designates a floating tip of the invention which comprises an elongated envelope 41 which is similar to the envelope 23 and which is provided with similar loops 42 and 43 at its ends. The envelope 41 encloses an elongated core 44 having a specific gravity sufficiently less than one to render the specific gravity of the entire floating tip 40 less than one. This is accomplished by forming the core 44 of a material, such as cork, having a specific gravity considerably less than one. In order to add weight to the floating tip 40, the core 44 may also include lead, or other material having a very high specific gravity, the lead preferably being in the form of small particles 45 distributed throughout the core. In order to maintain flexibility, the cork or other low-specific-gravity material employed for the core 44 is preferably in the form of a powder. If desired, the lead particles 45 may represent particles of lead powder.

Considering in more detail the advantages offered by the present invention, any of the floating tips 10, 30 and 40 provides sufficient weight for casting substantial distances, but is provided with a specific gravity less than one to insure floating and to substantially eliminate splashing upon contact with the surface of the water. Another important advantage of the present invention is that it permits casting greater distance for a given amount of line unwound from the reel since, by concentrating the weight of the system at the end of the line, there is substantially no slack in the line in casting.

Another advantage of the present invention is that it permits the use of a very fine monofilament line, thereby materially increasing the line capacity of the reel.

Another important advantage is that the floating tips 10, 30 and 40 provide sufficient weight to enable making a cast in a very few motions without any necessity for snapping the rod back and forth a large number of times before shooting the line. This means that the angler need not have as much clearance with respect to trees, bushes and the like to avoid snagging the line.

Another advantage of the present invention is that the floating tips 10, 30 and 40 permit casting above the desired spot in fishing a stream, whereupon the floating tips will carry the fly downstream to the desired spot.

One expedient conventionally employed to attain sufficient weight for distance casting is to weight the leader with shot. With such a shot-weighted leader, it is necessary for the angler to cast beyond the desired spot so that the fly will return to the desired spot as the leader sinks. Also, such a shot-weighted leader produces considerable splashing. With the present invention, on the other hand, the angler may cast any of the floating tips 10, 30 and 40 on the desired spot, or directly upstream therefrom in the case of stream fishing, whereupon the fly automatically reaches the desired spot as the leader sinks. Also, the present invention avoids the splashing incident to the use of shot-weighted leaders.

Although I have disclosed a number of exemplary embodiments of the present invention, it will be understood that various changes, modifications and substitutions may be incorporated in such embodiments without departing from the spirit of the invention.

I claim as my invention:

1. As an article of manufacture, a floating tip for a fly line, including an elongated element having a specific gravity of less than unity and having means at one end for attachment to a fly line and means at its other end for attachment to a leader, the length of said elongated element being very small as compared to the length of a conventional fly line, said elongated element including an elongated hollow core and an envelope enclosing said core, and said envelope carrying said attachment means at the ends of said elongated element.

2. A floating tip for a fly line as defined in claim 1 wherein said hollow core is closed at its ends.

References Cited in the file of this patent

UNITED STATES PATENTS

| Number | Name | Date |
| --- | --- | --- |
| 1,107,339 | Millirow | Aug. 18, 1914 |
| 2,212,772 | Graves | Aug. 27, 1940 |
| 2,215,760 | Ledrich | Sept. 24, 1940 |
| 2,218,946 | Barnett | Oct. 22, 1940 |
| 2,250,832 | Hedge | July 29, 1941 |
| 2,274,255 | Pierce | Feb. 24, 1942 |
| 2,371,667 | Arena et al. | Mar. 20, 1945 |